United States Patent
Hofstra et al.

(10) Patent No.: US 9,428,658 B2
(45) Date of Patent: Aug. 30, 2016

(54) SUBLIMATION TRANSFER INK COMPOSITION

(71) Applicant: OCE-TECHNOLOGIES B.V., Venlo (NL)

(72) Inventors: Ronald M. J. Hofstra, Venlo (NL); Mark A. M. Leenen, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/855,706

(22) Filed: Sep. 16, 2015

(65) Prior Publication Data

US 2016/0090493 A1    Mar. 31, 2016

(30) Foreign Application Priority Data

Sep. 30, 2014    (EP) .................................. 14187074

(51) Int. Cl.

| | |
|---|---|
| *C09D 11/14* | (2006.01) |
| *C09D 11/033* | (2014.01) |
| *B41M 5/035* | (2006.01) |
| *C09D 11/037* | (2014.01) |
| *C09D 11/38* | (2014.01) |
| *B41J 2/21* | (2006.01) |
| *B41J 2/48* | (2006.01) |
| *C09D 11/34* | (2014.01) |
| *B41J 2/165* | (2006.01) |

(52) U.S. Cl.
CPC .............. *C09D 11/14* (2013.01); *B41M 5/035* (2013.01); *C09D 11/033* (2013.01); *C09D 11/037* (2013.01); *C09D 11/38* (2013.01); *B41J 2/2107* (2013.01); *B41J 2/48* (2013.01); *B41J 2002/16564* (2013.01); *C09D 11/34* (2013.01)

(58) Field of Classification Search
CPC ...... C09C 1/0036; C09C 1/0063; B41J 2/48; B41J 2002/16564
See application file for complete search history.

(56) References Cited

U.S. PATENT DOCUMENTS

| | | | |
|---|---|---|---|
| 3,925,273 A | 12/1975 | Cuthbertson et al. | |
| 4,752,298 A | 6/1988 | Burglin et al. | |
| 6,409,330 B1* | 6/2002 | Nakamura | B41J 2/0057 347/101 |
| 6,790,268 B2* | 9/2004 | Lee | C09D 11/30 106/31.36 |

FOREIGN PATENT DOCUMENTS

| | | |
|---|---|---|
| EP | 1 020 499 A1 | 7/2000 |
| EP | 1 533 348 A1 | 5/2005 |
| GB | 1 433 763 A | 4/1976 |
| JP | 2000-212883 A | 8/2000 |
| WO | WO 2007/025185 A2 | 3/2007 |

OTHER PUBLICATIONS

Search Report issued in European priority application 14187074, dated Mar. 11, 2015.

* cited by examiner

*Primary Examiner* — Lisa M Solomon
(74) *Attorney, Agent, or Firm* — Birch, Stewart, Kolasch & Birch, LLP

(57) ABSTRACT

The present invention relates to an aqueous sublimation transfer ink composition. The sublimation transfer ink composition comprises a polysaccharide. The present invention further relates to a method of preparing said ink composition. The present invention also relates to a method for providing an image onto a receiving medium.

11 Claims, 1 Drawing Sheet

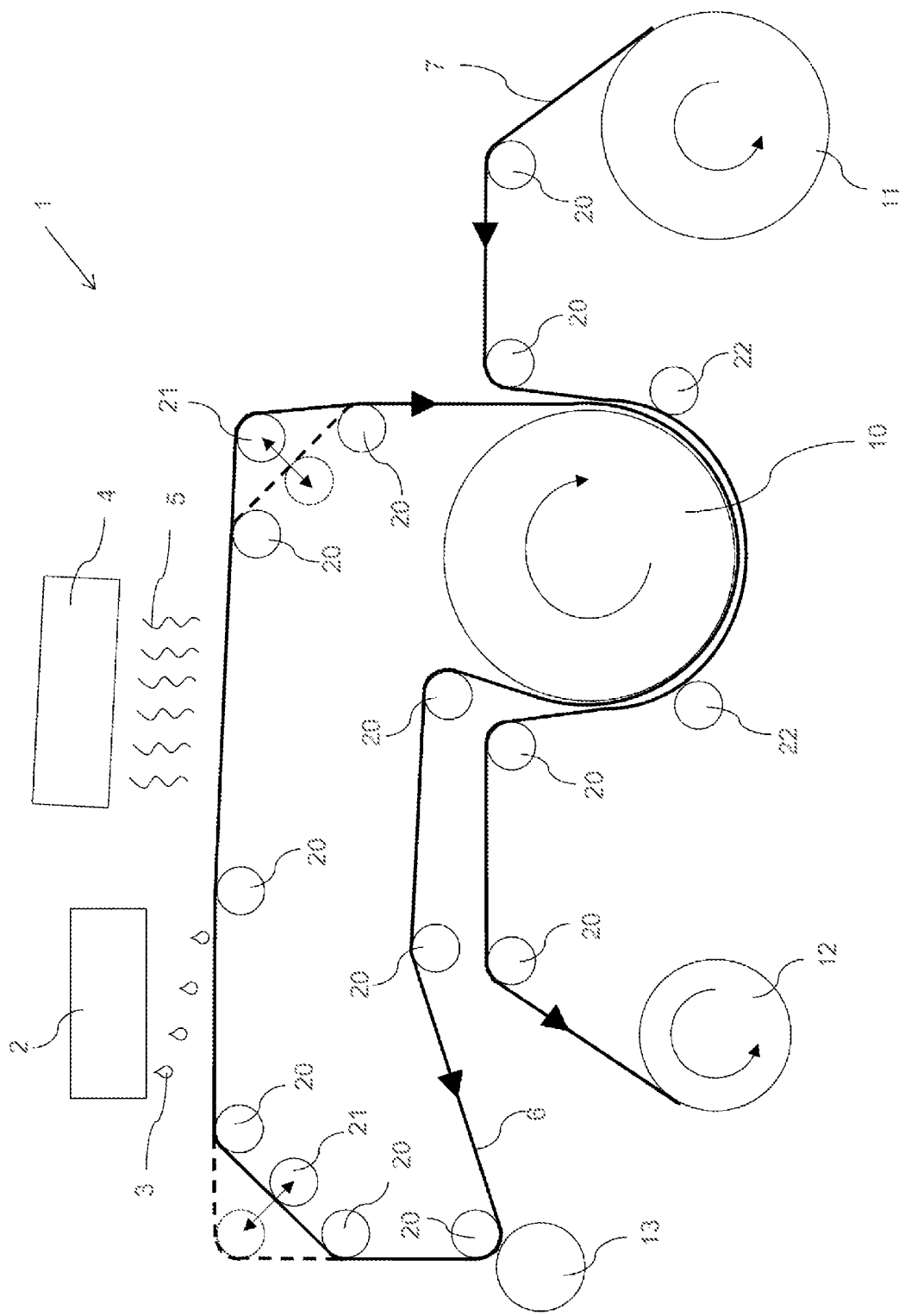

SUBLIMATION TRANSFER INK COMPOSITION

The present invention relates to a sublimation transfer ink composition. The present invention further relates to a method of preparing said ink composition. The present invention also relates to a method for providing an image onto a receiving medium.

BACKGROUND OF THE INVENTION

Sublimation transfer ink compositions, also known as disperse dye inks, are known from EP 1533347. Sublimation transfer ink compositions may comprise an aqueous medium and a heat transferable dye. Sublimation transfer ink compositions can be used to provide an image onto textile substrates, such as polyester fabrics. These fabrics can be used for making clothing.

When applying an image onto a textile substrate using a sublimation transfer ink composition, typically an image is applied onto an intermediate transfer member. This image is subsequently transferred to the textile substrate, thereby providing the textile substrate with the image.

However, sublimation transfer ink composition may suffer from bleeding: droplets of ink may spread too much on the intermediate transfer member and/or textile substrate, thereby causing phenomena such as color bleeding. The occurrence of color bleeding results in visual decrease of the print quality.

Therefore, it is an object of the invention to provide a sublimation transfer ink composition that provides improved image quality. It is a further object of the invention to provide a printing method providing improved image quality.

SUMMARY OF THE INVENTION

The objects of the invention is achieved in a sublimation transfer ink composition comprising
  an aqueous vehicle,
  a heat transferable dye,
  a polysaccharide,
  wherein the polysaccharide is a water-soluble, substantially non-ionic polysaccharide comprises at least one monosaccharide moiety, wherein the polysaccharide has a molar mass (Mn) of 1500 gram/mole or higher.

Aqueous Medium

The ink composition may comprise an aqueous vehicle, said vehicle comprising water. Water may function as the vehicle in the ink composition and may dissolve and/or disperse the components of the ink, such as the colorant and the polysaccharide. It may be beneficial to use water as the vehicle in the ink composition for health, safety and environmental reasons. When water evaporates, for example after droplets of the ink have been applied onto the receiving medium, no VOC's (volatile organic compounds) may be emitted. Moreover, water vapor may reduce the risk of fire, since water is not flammable, in contrast to many organic solvents. Furthermore, if traces of water remain on the textile substrate after transferring the print from the transfer member, this may have no negative health effect for persons wearing the printed textile substrate.

Optionally, co-solvents may be added to the ink composition. Co-solvents may be added to tune the properties of the ink composition, for example the polarity of the ink and/or the viscosity of the ink.

Co-solvents may be present in the ink composition in an amount of from 0 wt %-40 wt % with respect to the total ink composition, for example from 2 wt %-32 wt % with respect to the total ink composition. Non-limiting examples of co-solvents are glycol, ethylene glycol, propylene glycol, diethylene glycol, glycerin, 1,2-propanediol, n-pyrrolidone, 1,5-pentanediol, 1,6-hexanediol and 1,2,6-hexanetriol. The co-solvent, as well as the amount of the co-solvent added to the ink composition may preferably be selected such that the heat transferable dye may be dispersible in the ink composition and the polysaccharide may be soluble in the resulting ink composition.

Heat Transferable Dye

The sublimation transfer ink composition may comprise a heat transferable dye. Preferably, the heat transferable dye is a dispersible dye. The dye may provide the ink composition with a color, such as cyan, magenta, yellow or black. However, differently colored dyes may also be usefully applied in the ink composition according to the present invention. Optionally, a mixture of dyes may be used.

Transferring the ink from the intermediate transfer member to the transfer substrate may take place at elevated temperatures, for example elevated temperatures in the range of 130° C.-240° C. During transfer, the dye may sublimate and may be transferred to the textile substrate, thereby providing the textile substrate with an image.

Examples of heat transferable dyes are azo, anthraquinone, quinophthalone, oxazine, triazine, styryl, diphenylmethane, triphenylmethane, azomethine, xanthenes, acridine, methane and diazine compounds suitable for sublimation dye.

The ink composition may further comprise a dispersant for dispersing the heat transferable dye in the aqueous vehicle of the ink composition. In addition, the dispersant may stabilize fine particles of the dye present in the ink composition. The dispersant may be selected from an anionic dispersant, a cationic dispersant and a nonionic dispersant. Optionally, a combination of dispersants may be used.

Polysaccharide

The sublimation transfer ink composition may further comprise a polysaccharide. The polysaccharide may be a water-soluble polysaccharide. The polysaccharide may further be a non-ionic polysaccharide. Non-ionic polysaccharides that are water soluble may be added to the ink composition in a high concentration, for example from 5-50 wt % (based on the total weight of the ink composition). The polysaccharide may comprise at least one monosaccharide moiety. For example, the polysaccharide may comprise a glucose, a fructose, a sorbitol, or an isosorbide moiety. The polysaccharide may comprise only one type of monosaccharide moiety, but alternatively, the polysaccharide may comprise a plurality of monosaccharide moieties. The polysaccharide may have a molar mass (Mn) of 1500 gram/mole or higher. High molecular weight polysaccharides may be non-volatile, which is beneficial when the image made using the sublimation transfer ink composition is transferred. Non-volatile high molecular weights polysaccharides may not be transferred from an intermediate transfer member to the (textile) receiving medium during the sublimation transfer process and hence, this additive in the ink composition may not end up on the final printed product. However, even if a small amount of the polysaccharide would be transferred to the textile, this may not lead to problems, such as health risks, because polysaccharides are biobased materials.

Preferably, the polysaccharide may comprise more than one type of monosaccharide moiety. Examples of suitable polysaccharides are polydextrose, chitosan and glucose-fructose polysaccharides, such as glucose-fructose syrup.

The presence of the polysaccharide may decrease the drying time. This may allow the ink to dry fast after it has been applied onto a (intermediate) receiving member. The polysaccharide is preferably present in an amount of from 5 wt % to 50 wt %, based on the total weight of the ink composition, such as from 7 wt %-40 wt %, for example from 15 wt %-30 wt %. When polysaccharide is present in low amounts, e.g. less than 5 wt % based on the total weight of the ink composition, then the drying time of the ink composition may increase. When polysaccharide is present in high amounts, e.g. more than 50 wt % based on the total weight of the ink composition, then the polysaccharide may not dissolve any more, which may result in problems when applying the ink onto the (intermediate) receiving member.

Other Components

The sublimation transfer ink composition may further comprise surfactants for controlling the surface tension of the ink. Furthermore, the ink composition may comprise biocides to suppress growth of micro-organisms, such as bacteria and funghi. The ink composition may further comprise defoamers and/or buffers.

In an embodiment, the at least one monosaccharide unit is a glucose unit.

In a further embodiment, the polysaccharide further comprises a sorbitol moiety. Polysaccharides that comprise a glucose unit and a sorbitol moiety are generally solid at room temperature and may be used as a solid solvent in a sublimation transfer ink composition. A solid solvent may not evaporate when drying the ink composition, but may solidify when (part of) the liquid vehicle of the ink composition evaporates. Therefore, using a solid solvent has a number of advantages. In the first place, less energy is required, as the solid solvent does not need to evaporate. In the second place, less solvent vapors are generated when drying the ink, which is beneficial from a HSE (health, safety & environmental) point of view.

In a further embodiment, the polysaccharide is polydextrose. Polydextrose is a polysaccharide that a glucose unit and a sorbitol moiety. Polydextrose is a synthetic polysaccharide component prepared from glucose, isosorbide and citric acid.

It was found that adding polydextrose to a sublimation transfer ink composition provides the ink composition with pinning property. Due to the pinning property, the viscosity of the ink may increase quickly after printing, such that flow of the ink droplets is limited. Limiting the flow of droplets may prevent unwanted phenomena, such as color bleeding from occurring. When color bleeding occurs, a droplet of ink having a first color mixes with a droplet of ink having a second color, due to excessive flow of the droplets, which may result in unwanted mixing of colors. Hence, color bleeding is an unwanted phenomenon.

In addition, polydextrose may be added to an aqueous solution, such as an aqueous sublimation transfer ink composition in a large amount, without substantially effecting the rheological properties of the solution. The rheological properties of an ink composition are important when jetting droplets of the sublimation transfer ink composition using an inkjet print head. If the rheological properties of the ink composition do not match the requirements of the inkjet print heads used, droplet formation may be impossible.

Hence, addition of polydextrose to a sublimation transfer ink composition may improve the properties of the ink composition.

In an embodiment, the sublimation transfer ink composition further comprises a first surfactant and a second surfactant, the first surfactant being a sulfonate surfactant and the second surfactant being a nonionic alkylethoxylate.

Sulfonate surfactants are an example of an anionic surfactant. Examples of sulfonate surfactants are ligno sulfonate, polyoxyethylene alkyl ether sulfonate, formaldehyde condensates of sulfonates, such as naphthalene sulfonate formaldehyde condensate and sodium cresol sulfonate formaldehyde condensate.

Examples of nonionic alkylethoxylates are ethoxylated alcohols derived from long chain alcohols, i.e. alcohols having 10-60 C atoms. Commercially available examples of ethoxylated alcohols are products from the Unithox™ products range from Baker Hughes, for example Unithox™ 420, Unithox™ 450, Unithox™ 480, Unithox™ 490, Unithox™ 550, Unithox™ 720 and Unithox™ 750.

In a sublimation transfer ink composition comprising a sulfonate surfactant as well as a nonionic alkylethoxylate, the stability of the dispersed dyes is improved compared to sublimation transfer ink compositions comprising a sulfonate surfactant, but not comprising the nonionic alkylethoxylate surfactant.

In an aspect of the invention, a method for preparing an ink composition according to the invention is provided, the method comprising the steps of:
  a) Preparing a dye dispersion by mixing a dispersible dye, a dispersant and an aqueous medium;
  b) preparing the ink composition by mixing the dye dispersion and the polysaccharide.

The sublimation transfer ink composition may be prepared in a two-step method. In step a), a dye dispersion may be prepared by mixing a dispersible dye, a dispersant and an aqueous medium. These components may be mixed while being ground. This may result in the formation of a dye dispersion, wherein the average particle size of the dispersed dye particles is relatively small, for example in the range of from 80 nm-200 nm.

In step b), an ink composition may be prepared starting from the dye dispersion prepared in step a), by mixing the dye dispersion with the polysaccharide, wherein the polysaccharide is a water-soluble, substantially non-ionic polysaccharide comprising at least one monosaccharide moiety, wherein the polysaccharide has a molar mass (Mn) of 1500 gram/mole or higher.

Optionally, in step b), additional components, such as solvents, surfactants, etc may be added.

In an aspect of the invention, a method for providing an image onto a receiving medium is provided, the method comprising the steps of:
  a. applying the sublimation transfer ink composition according to the invention onto an intermediate transfer member in a predetermined manner, thereby forming an image;
  b. transferring the image from the intermediate transfer member to the receiving medium by contacting the intermediate transfer member and the receiving medium at elevated temperature.

In the method, an image is applied onto a receiving medium using an intermediate transfer member. In the method, in step a), an image is applied to the intermediate transfer member. The image may be applied using an ink composition according to the present invention. The ink composition may be applied onto the intermediate transfer member in a predetermined fashion, e.g. in accordance with image files stored on suitable storing means. The image may be applied for example by jetting droplets of the sublimation transfer ink composition using an inkjet print head. The intermediate transfer member may be a sheet-like medium, such as a sheet of paper. Alternatively, the intermediate transfer member may be a web, for example an endless belt. The web may be made of a suitable material. Optionally, the image may be dried after it has been applied onto the intermediate transfer member.

In the method, in step b), the image is transferred from the intermediate transfer member to the receiving medium. This transfer may take place by contacting the intermediate transfer member and the receiving medium. The intermediate transfer member and the receiving medium may be contacted at elevated temperature. At elevated temperature, the colorant present in the sublimation transfer ink composition may sublimate and may be transferred from the intermediate transfer member to the receiving medium, thereby transferring the image. Optionally, pressure may be applied during transfer of the image In an embodiment, the intermediate transfer member is a re-usable transfer member comprising polyimide. The intermediate transfer member is configured to transfer an image to the receiving member. It is preferred to use an intermediate transfer member a plurality of times, to reduce waste. A re-usable intermediate transfer member may preferably be heat resistant, as it will have to undergo the transfer step, which takes place at elevated temperatures, a plurality of times. Furthermore, it is preferred that the re-usable intermediate transfer member is cleanable. This may prevent that subsequently printed images comprise remaining of previous prints. Preferably, the intermediate transfer member is substantially non-porous. An intermediate transfer member comprising polyimide may be a suitable re-usable transfer member. Examples of commercially available polyimide materials are Upilex, such as Upilex-R films and Upilex-S films, available from Ube Technologies Ltd. or Kapton® from Dupont™.

In an embodiment, the intermediate transfer member is an endless belt. An endless belt may be suitably applied in the method according to the invention. When using an endless belt, a continuous printing process may be used, increasing productivity. Preferably, the endless belt is re-usable.

In an embodiment, the final medium is selected from the group consisting of a polyester medium, an acetate medium and a nylon medium. Polyester, acetate and nylon media are suitable media to be used in combination with a sublimation transfer ink composition. Polyester, acetate and nylon media can be suitably used e.g. as indoor decoration, and as materials for making clothing or textile banners. Hence, when using these media, clothing can be provided with an image using a sublimation transfer ink composition according to the present invention.

BRIEF DESCRIPTION OF THE DRAWINGS

FIG. 1 shows a schematic representation of an inkjet printing system.

DETAILED DESCRIPTION OF THE DRAWINGS

In the drawings, same reference numerals refer to same elements.

FIG. 1 shows an inkjet printing system 1. The inkjet printing system 1 comprises a jetting assembly 2. The jetting assembly 2 may comprise at least one print head (not shown). The at least one print head may comprise a plurality of nozzles (not shown). The print heads may eject droplets 3 of a fluid, such as a sublimation transfer ink composition, onto the intermediate transfer medium 6. One color of ink may be applied onto the intermediate transfer member 6, but preferably, a plurality of differently colored fluids is used to apply an image onto the intermediate transfer member 6. The intermediate transfer medium 6, as depicted in FIG. 1, is an endless belt. The endless belt may be made of a suitable material. The intermediate transfer medium 6 is guided by rollers and is moved in the direction indicated by the arrows in FIG. 1. The intermediate transfer rollers may be guided by a plurality of rollers, for example guiding rollers 20. As depicted in FIG. 1, the intermediate transfer member is further guided by sublimation transfer drum 10, pressing rollers 22 and adjustable guiding rollers 21. When an image has been applied onto the intermediate transfer member 6 by applying droplets 3 of the fluid, the intermediate transfer member 6 is advanced in the indicated direction, such that the image passes underneath drying unit 4. The drying unit 4 may dry the image by applying heat to the intermediate transfer member 6 provided with the image. For example, the drying unit 4 may emit IR radiation, schematically depicted in FIG. 1 as radiation 5. Alternatively and/or additionally, the drying unit 4 may blow air to dry the image.

After the image has been dried, the intermediate transfer member 6 is moved further in the indicated direction, thereby passing adjustable guiding roller 21. Another adjustable guiding rollers is provided upstream of the jetting assembly 2. The adjustable guiding rollers may be moved, thereby adjusting the path traveled by the intermediate transfer member 6. By adjusting the respective positions of the adjustable guiding rollers 21 when advancing the intermediate transfer member 6, the movement of the intermediate transfer belt 6 may be switched from stepwise movement to continuous movement. Hence, when the intermediate transfer member 6 is moved underneath the jetting assembly 6, the belt may locally move in a stepwise fashion. Consequently, a swath of an image may be printed while the part of the member 6 positioned underneath the jetting assembly 2 does not move with regard to the jetting assembly. In this way, an image may be suitably applied to the intermediate transfer member 6. Once the (dried) image passes the adjustable guiding roller, the transfer member 6 may locally move in a continuous fashion; i.e. the transfer member 6 may be locally advanced with a continuous speed. Alternatively, the intermediate transfer member 6 may travel the entire path in a stepwise manner or a continuous fashion.

After the image has been applied onto the intermediate transfer member 6 and has been dried, the intermediate transfer member 6 may advance in the direction indicated by the arrows in FIG. 1. The part of the transfer member 6 provided with the image may arrive at sublimation transfer drum 10. The sublimation transfer drum 10 is depicted in FIG. 1 as a rotating drum.

The inkjet printing system 1 is further provided with a receiving medium transporting means. The receiving medium transporting means comprise a receiving medium supply roller 11 and a receiving medium take up roller 12, as well as a plurality of guiding rollers 20 and pressing rollers 22. The receiving medium 7 may be any suitable type of receiving medium, for example a web of textile, such as acetate, nylon or polyester. The receiving medium transporting means are configured to transport the receiving medium 7 along the sublimation transfer drum 10.

The sublimation transfer drum 10 may in operation be kept at a predetermined temperature, for example 180° C. The sublimation transfer drum 10 may be provided with suitable heating means. Alternatively, the sublimation transfer drum 10 as well as the parts of the intermediate transfer member 6 and the receiving medium 7 contacting the sublimation transfer drum 10 may be heated externally.

The sublimation transfer drum 10, the intermediate transfer member 6 and the receiving medium 7 are arranged such that the intermediate transfer member 6 is sandwiched between the sublimation transfer drum 10 and the receiving medium 7, when it reaches the sublimation transfer drum 10. When the intermediate transfer member 6 reaches the sublimation transfer drum 10, the intermediate transfer member 6 provided with the image is heated. In additional, it is brought into contact with the receiving member. The colorants present in the image may sublimate. The image applied onto the intermediate transfer member 6 is directed towards the receiving member. Hence, when the intermediate transfer member 6 is sandwiched between the sublimation transfer drum 10 and the receiving member, the image is transferred from the intermediate transfer member 6 to the receiving medium 7, thereby providing the receiving member 7 with the image. In addition, the receiving member 7 is pressed against the intermediate transfer member 6 by the pressing rollers 22. Applying pressure in addition to the elevated temperature provides efficient transfer of the image to the receiving medium 7.

After the image has been transferred, the receiving medium 7 provided with the image may be advanced towards the receiving medium take up roller 12.

The intermediate transfer member 6 may be advanced towards the jetting assembly 2 to be provided with another image. However, before the intermediate transfer member 6 arrives at the position underneath the jetting assembly 2, it passes cleaning unit 13. In FIG. 1, the cleaning unit 13 is depicted as a cleaning roller. However, any suitable cleaning unit may be used. Examples of cleaning units are brushes, wiper units comprising a wiper blade and/or a wet wiping unit, etc. The cleaning unit 13 is configured to remove any contaminant, such as ink residues and/or fibers from the receiving medium 7 from the intermediate transfer member 6. This may prevent that subsequently printed images comprise unwanted residues from previous prints. Optionally, the cleaning unit may comprise a solvent to clean the intermediate transfer member 6.

EXPERIMENTS AND EXAMPLES

Materials

STA-Lite® R90 (polydextrose), was obtained from Tate&Lyle. As lignosulfonate surfactant, Lignosulfonate Ultrazine NA obtained from Borregaard Lignotech was used. Disperse dyes Foron Brilliand Red E-2BL, Foron Brilliant Yellow E-3gFL and Floron Brilliant Blue AS-BG were obtained from Clariant. Unithox 480 was obtained from Baker Hughes, Triton X100 and AOT were obtained from Sigma Aldrich and Metolat Agitan 526 was obtained from Münzing Chemie GmbH.

Roland Dye sublimation inks were obtained from Sihl Benelux BV and Sawgrass dye sublimation inks were obtained from Signseen.

All materials used in the examples are used as obtained from the supplier, unless otherwise stated.

Methods

Printing Method

Prints were made on a Ricoh Geljet SG 3110 desktop printer. A Upilex-S film (obtained from Ube Technologies Ltd.) was used as intermediate transfer medium. The images applied onto the intermediate transfer medium were dried by heating in an oven.

The dried images were transferred onto a polyester medium using a Stahls Basic Clam Heat Press of 200° C. The contact time, during which the intermediate transfer medium and the polyester medium were contacted, was 60 seconds.

Drying Time

The drying times were determined by an operator who visually inspected whether the printed image had dried, and who further determined the drying time using a stopwatch.

Color Bleeding

Color bleeding was inspected visually. An operator investigated whether cyan and/or magenta ink had bled into yellow ink by visually inspecting the printed image applied onto the textile medium.

When cyan and/or magenta ink had bled into yellow ink, it was concluded that color bleeding had occurred.

Examples

Several sublimation ink compositions were prepared. Ink composition 11, 12 and 13 comprises polydextrose and are ink compositions according to the present invention, whereas ink compositions CE 1 and CE 2 are not ink compositions according to the present invention.

Production Example Ex A

Sublimation Dye Dispersion 1

Sublimation Dye Dispersion 1 was prepared by mixing 50.25 g of Magenta Dye, 67 g of Lignosulfonate surfactant, 16.75 g of Unithox 480 surfactant, 3 g of Triton X100 surfactant, 3 g of Metolat Agitan 526 and 195 g of water. The components were mixed in a Netsch laboratory ball mill at 2500 rpm using 200 g of Zirmill bals having a diameter of 0.5 mm. The components were mixed for 16 hours, resulting in the formation of Sublimation dye Dispersion 1.

Sublimation Dye Dispersion 2 (yellow) and Sublimation Dye Dispersion 3 (cyan) were prepared analogously, see also table 1.

TABLE 1

Compositions of Sublimations Dye Dispersions

| Component | Sublimation Dye Dispersion 1 | Sublimation Dye Dispersion 2 | Sublimation Dye Dispersion 3 |
|---|---|---|---|
| Disperse Dye | 50.25 | 50.25 | 24.3 |
| Lignosulfonate | 67 | 67 | 32.4 |
| Unithox 480 | 16.75 | 16.75 | 8.1 |
| Triton X100 | 3 | 3 | 1.5 |
| Metolan Agitan 526 | 3 | 3 | 1.5 |
| Water | 195 | 195 | 195 |

Sublimation Ink Composition 11

Sublimation Ink Composition 11 was prepared by mixing 26.6 g of Sublimation Dye Dispersion 1, 25 g of polydextrose, 48.4 g of water and 0.32 g of AOT. The components were mixed in a flask for 30 minutes using a magnetic stirring bar, resulting in the formation of Sublimation Ink Composition 11.

Sublimation Ink Compositions 12 (yellow) and 13 (cyan) were prepared analogously, using sublimations dye dispersions 2 and 3, respectively. See also table 2.

TABLE 2

Compositions of Sublimations Ink Compositions

| Component | Sublimation Ink Composition 11 | Sublimation Ink Composition 12 | Sublimation Ink Composition 13 |
|---|---|---|---|
| Disperse Dye Dispersion (g) | 26.6 | 22.75 | 65.0 |
| Polydextrose (g) | 25.0 | 25.0 | 25.0 |
| Water (g) | 48.4 | 52.5 | 10.0 |
| AOT (g) | 0.32 | 0.32 | 0.32 |
| viscosity at 25° C. (mPas) | 6.6 | 6.0 | 15.2 |

The viscosities of the respective ink compositions 11-13 are in the range of 6.0-15.2 mPas, which makes them suitable to be jetted using an inkjet print head.

Sublimation ink compositions 11, 12 and 13 together form ink set 10.

Comparative Ink Compositions

As comparative ink compositions, Roland dye sublimation inks were used (black, magenta, yellow and cyan, respectively). This set of ink compositions is referred to as CE 1.

In addition, Sawgrass dye sublimation inks were used (black, magenta, yellow and cyan, respectively). This set of ink compositions is referred to as CE 2. Comparative ink compositions CE 1 and CE 2 are not ink compositions according to the present invention.

Comparison Experiments

Printing Experiments

Prints made with different ink sets (10, CE 1 and CE 2) were made on a Upilex-S intermediate transfer member. Prints made using ink set 10 (set of ink compositions according to the present invention) are referred to as prints 20. Prints made using inks sets CE 1 and CE 2 (set of ink compositions not according to the present invention) are referred to as CE 21 and CE 22, respectively.

The drying time as well as the print quality of the prints was evaluated. The drying time is the amount of time that it takes for the image printed on the intermediate transfer member, to dry. The drying times are summarized in table 3.

TABLE 3

Drying times for prints 20, 21 and 22.

| | 20 | CE 21 | CE 22 |
|---|---|---|---|
| Drying time (s) | 5 min at 90° C. | 15 min at 110° C. | 15 min at 110° C. |

It was observed that print 20, which is the print made using the ink set consisting of ink compositions according to the present invention, showed shorter drying times than comparative prints CE 21 and CE 22. Prints need to be dried before the image is transferred from the intermediate transfer member to the textile receiving medium (polyester medium). Hence, shorter drying times allow higher productivity in a printing system for textile printing applications.

Print quality is evaluated by investigating whether color bleeding occurs. Color bleeding is the phenomenon that a droplet of a first color flows into a droplet of a second color, resulting in unwanted mixing of colors. Color bleeding is an unwanted phenomenon. The results are summarized in table 4.

TABLE 4

Color bleeding for prints 20, 21 and 22.

| | 20 | 21 | 22 |
|---|---|---|---|
| Color bleeding yes/no | no | yes | yes |

Print 20, which is the print made using the ink set consisting of ink compositions according to the present invention, does not show color bleeding, whereas prints 21 and 22 do show color bleeding. Hence, the print quality of print 20 is better than the print quality of prints 21 and 22. Thus, sublimation ink compositions according to the invention provide improved print quality compared to ink compositions not according to the present invention.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed.

The invention claimed is:

1. A sublimation transfer ink composition, comprising
an aqueous vehicle,
a heat transferable dye,
a polysaccharide,
wherein the polysaccharide is a water-soluble, substantially non-ionic polysaccharide comprises at least one monosaccharide moiety, wherein the polysaccharide has a molar mass (Mn) of 1500 gram/mole or higher, wherein the at least one monosaccharide unit is a glucose unit, and wherein the polysaccharide further comprises a sorbitol moiety.

2. The sublimation transfer ink composition according to claim 1, wherein the polysaccharide is polydextrose.

3. The sublimation transfer ink composition according to claim 1, wherein the sublimation transfer ink composition further comprises a first surfactant and a second surfactant, the first surfactant being a sulfonate surfactant and the second surfactant being a nonionic alkylethoxylate.

4. A method for preparing an ink composition according to claim 1, the method comprising the steps of:
   a) preparing a dye dispersion by mixing a dispersible dye, a dispersant and an aqueous medium; and
   b) preparing the ink composition by mixing the dye dispersion and the polysaccharide.

5. A method for providing an image onto a receiving medium, the method comprising the steps of:
   a. applying the sublimation transfer ink composition according to claim 1 onto an intermediate transfer member in a predetermined manner, thereby forming an image; and
   b. transferring the image from the intermediate transfer member to the receiving medium by contacting the intermediate transfer member and the receiving medium at elevated temperature.

6. The method according to claim 5, wherein the intermediate transfer member is a re-usable transfer member comprising polyimide.

7. The method according to claim 5, wherein the intermediate transfer member is an endless belt.

8. The method according to claim 5, wherein the receiving medium is selected from the group consisting of a polyester medium, an acetate medium and a nylon medium.

9. The sublimation transfer ink composition according to claim 1, wherein the polysaccharide is present in an amount of from 5 wt % to 50 wt %, based on the total weight of the sublimation transfer ink composition.

10. The sublimation transfer ink composition according to claim 1, wherein the polysaccharide is present in an amount of from 7 wt % to 40 wt %, based on the total weight of the sublimation transfer ink composition.

11. The sublimation transfer ink composition according to claim 1, wherein the polysaccharide is present in an amount of from 15 wt % to 30 wt %, based on the total weight of the sublimation transfer ink composition.

\* \* \* \* \*